United States Patent
Brockhus et al.

Patent Number: 5,466,478
Date of Patent: Nov. 14, 1995

[54] GLAZING AGENT

[75] Inventors: Jeroen J. Brockhus, Breda; Jeanette D. Moree, Gouda, both of Netherlands; Jannes G. Lammers, Ganderkesee, Germany; Tileman Rodenburg, Vlaardingen, Netherlands

[73] Assignee: Unilever Patent Holdings B.V., Vlaardingen, Netherlands

[21] Appl. No.: 344,612

[22] Filed: Nov. 18, 1994

Related U.S. Application Data

[63] Continuation of Ser. No. 88,653, Jul. 9, 1993, abandoned.

[30] Foreign Application Priority Data

Jul. 10, 1992 [EP] European Pat. Off. ............... 92202112
Jan. 14, 1993 [EP] European Pat. Off. ............... 93200088

[51] Int. Cl.$^6$ .................................................. A23D 7/005
[52] U.S. Cl. ........................... 426/602; 426/605; 426/653; 426/657
[58] Field of Search ............................. 426/94, 602, 605, 426/653, 657

[56] References Cited

U.S. PATENT DOCUMENTS

| | | | |
|---|---|---|---|
| 3,088,829 | 5/1963 | Rapaport | 426/94 |
| 3,995,069 | 11/1976 | Harries | 426/653 X |
| 4,389,420 | 6/1983 | Yong et al. | 426/94 |
| 4,637,937 | 1/1987 | Terada et al. | 426/602 X |
| 4,645,674 | 2/1987 | Lang et al. | 426/94 |
| 4,696,826 | 9/1987 | Leusner et al. | 426/565 |
| 4,762,721 | 8/1988 | Holseher et al. | 426/653 X |
| 5,160,759 | 11/1992 | Nomura et al. | 426/602 |

FOREIGN PATENT DOCUMENTS

| | | |
|---|---|---|
| 205195 | 12/1986 | European Pat. Off. . |
| 2303703 | 8/1974 | Germany . |
| 6813493 | 3/1970 | Netherlands . |

OTHER PUBLICATIONS

Dialog, One Search and INPADOC computer searches.

*Primary Examiner*—Arthur L. Corbin
*Attorney, Agent, or Firm*—Cushman Darby & Cushman

[57] ABSTRACT

The invention concerns ready-to-use glazing agents with the composition:

- 5–25 wt. % of liquid vegetable oil;
- 5–15 wt. % of casein or its salts;
- 0.005–10 wt. % of emulsifier;
- 0.1–8.0 wt. % of a compound giving a browning upon heating, preferably by a Maillard-type of reaction and balance: water.

The composition is sterilizable and has a shelf-life after sterilization of more than 3 months.

12 Claims, No Drawings

GLAZING AGENT

This is a continuation of application Ser. No. 08/088,653, filed on Jul. 9, 1993, now abandoned.

The invention is concerned with glazing agents that are ready to use.

BACKGROUND OF THE INVENTION

Glazing agents that are not ready to use are known from, e.g., EP 205,195. According to this reference, a glazing agent can be provided comprising a homogenized emulsion of a protein, an edible oil, water and a thin-boiling starch. The thin-boiling starch is applied in order to regulate the viscosity of the emulsion.

However, the keepability of such a glazing agent was not sufficient. Although this keepability could be increased by drying the glazing agent, the resulting product was no longer ready to use.

Therefore, we have performed a study in order to find a glazing agent that:

is ready to use;
has the required spreadability, i.e. viscosity;
shows good keepability.

SUMMARY OF THE INVENTION

As a result of this study, we have found that ready-to-use glazing agents fulfilling the above-mentioned requirements have the following composition:

They are fat-in-water emulsions comprising:

1–25 wt. %, preferably 5–15 wt. %, of a liquid vegetable oil;

5–15 wt. %, preferably 8–11 wt. %, of casein or one of its salts;

0.005–10 wt. % of an emulsifier, preferably 0.01–1.0 wt. % of an emulsifier, in particular one selected from the group of fatty acid monoglycerides and diglycerides from $C_{14}$–$C_{22}$, preferably saturated and/or unsaturated $C_{16}$–$C_{18}$ fatty acids;

0.1–8.0 wt. % of a composition giving a browning upon heating, preferably a Maillard-type reaction, such as lactose, or a milk product containing lactose, amounts of 0.3–3 wt. % being preferred, while suitable milk products are skimmed milk powder or buttermilk powder;

balance: water

DESCRIPTION OF PREFERRED EMBODIMENTS

The liquid vegetable oil being defined as an oil being liquid up to 30° C. (so: $N_{30}\approx 0$). So, our composition is free of starch or modified starch.

The viscosity of the composition at 20° C. is 1–$10^5$ mPa.s, preferably 20–200 mPa.s.

The keepability of these compositions is very satisfactory as the compositions can be sterilized by UHT treatment, i.e. 1–30 seconds at 130°–160° C. After this treatment, the viscosity of the glazing agent remains within the specifications, while keepabilities (ambient shelf-lives) are obtained for at least 3 months.

The best results are obtained by applying a liquid vegetable oil with a solid fat index at 20° C. of less than 7.0, a preferred oil being a medium-hardened soybean oil.

This liquid oil can also comprise some amount, in particular 2–15 wt % on oil, of a hydrogenated vegetable fat. A preferred fat being hydrogenated palm oil, in particular PO-45. Application hereof improves the viscosity and the stability of the product.

It was further found, that the desired colouring, due to heating of a food product provided with a layer of our glazing agents, could be obtained, when our compositions contained 0.1–8.0 wt % of a compound or a mixture that can give a a browning upon heating, preferably by a Maillard-type of reaction. Browning can be obtained by Maillard reactions (amino sugar reactions), by caramelization of sugars or by oxidative reactions. Examples of Maillard compositions are lactose, preferably in combination with a protein-source, such as milk products containing lactose.

The stability of the water-continuous emulsion is greatly dependent on the droplet size of the fat droplets in the emulsion. Droplet sizes of less than 5.0 µm, in particular of 0.5–2.0 µm, are preferred.

We also found that the presence of some egg-yolk in our composition leads to an improved emulsion stability. Therefore, we prefer that our ready-to-use glazing agents also comprise 1–10 wt % in particular 2–8 wt % of an egg-yolk composition. Preferred egg yolk compositions contain some salt, in particular 5–15 wt % (on egg yolk).

The glazing agents according to the invention can be applied on normal dough (i.e. of ambient temperature) and on frozen dough. Baking of the dough, with or without thawing of the dough before baking, leads to excellent gloss, appearance and colour of the baked products.

The glazing agent is normally applied in amounts of 30–100 mg/cm². Spraying or atomizing are standard techniques for the distribution of the glazing agent; however, brushing should also be possible.

Although above products display excellent glazing properties, we found that upon use (by spraying) of the glazing agent over the product to be baked, which normally is performed on a baking-sheet, the part of the material, that is in direct contact with the hot baking-sheet is very difficult to remove from the baking sheet after baking of the product.

In order to improve the cleaning abilities of our glazing agents, we found that addition of 0.05–2.5 wt % of a pyrophosphate, in particular 0.1–1.5 wt %, resulted in the required improvement. Preferred pyrophosphates are the alkali-pyrophosphates, preferably sodium pyrophosphate.

Good results have been obtained by any of the following procedures:

I
1. making a dough, moulding and proofing it;
2. coating it with glazing agent;
3. baking of fresh product.

II
1. making a dough and moulding it;
2. coating it with glazing agent;
3. baking of fresh product.

III
1. making a dough, moulding and proofing it;
2. coating it with glazing agent;
3. freezing of the coated product;
4. frozen storage: 3 weeks;
5. baking of the frozen product without thawing.

IV
1. making a dough and moulding it;

2. coating of the dough with glazing agent;
3. freezing of the coated dough;
4. frozen storage: different periods;
5. thawing of the frozen, coated dough;
6. proofing of the product of 5);
7. baking of the product of 6).

V
1. making a dough and moulding it;
2. coating it with glazing agent;
3. freezing of the dough;
4. frozen storage: different periods;
5. thawing;
6. baking of the coated, thawed, frozen dough.

In process IV, relative humidity has an impact on the product properties. It was found that too high an R. H. (i.e. >60%) led to relatively worse products.

It is also possible to apply the glazing agent according to the invention for the preparation of microwavable, proofed, baked, frozen and coated doughs.

EXAMPLES

I A pre-mix was made in water of 80° C. containing the water, skimmed milk powder and sodium caseinate.

Simultaneously, a mixture of unsaturated mono- and diglycerides was dissolved in soybean oil ($N_{20} \approx 0$).

The fat mixture was added to the water phase and the mixture was subjected to Ultra Turrax mixing for 5 minutes. The $D_{3.2}$ (= droplet size) was 3.8 µm.

The composition was sterilized by indirect heat treatment (8 seconds at 140° C.).

The composition of the resulting glazing agent was:

|  | wt. % |
| --- | --- |
| Water | 80.0 |
| Na-caseinate | 10.0 |
| SMP | 2.0 |
| BO | 7.9 |
| Emulsifier | 0.06 |

The viscosity ($\eta_{20}$) of the sterilized product was about 200 mPa.s.

II The procedure of Example I was repeated; however, the Ultra Turrax mixing was followed by a pressure-homogenization procedure (at about 50 bar). This resulted in a product having a droplet size before sterilization of about 1.9 µm. The $\eta_{20}$ of the sterilized product was about 100 mPa.s.

III The products were evaluated on the following product types: Dänische Brötchen, croissants, puff pastry sheets and "gevulde koeken" ($\approx$ almond paste cakes).

Therefore, the procedures mentioned above (I–V) were applied, as illustrated in Table I.

TABLE I

| | Products | | | |
| --- | --- | --- | --- | --- |
| | Yeast-leavened rich dough: 'Dänische Brötchen' | Yeast-leavened laminated dough: Croissants | Laminated dough: Puff pastry sheets | Short dough: 'gevulde koeken' ($\approx$ almond paste cakes) |
| Procedure | | Sample number | | |
| I | 1 | 2 | | |
| II | | | 3 | 4 |
| III | | | | |
| Frozen storage: | | | | |
| 3 weeks | | 5 | | |
| IV | | | | |
| Frozen storage: | | | | |
| 2 weeks | 6 | | | |
| 3 weeks | | 7/8 | | |
| 90% — RH | 6 | 7 | | |
| 45% — RH | | 8 | | |
| V | | | | |
| 2 weeks | | | 9 | 10 |

In Tables II and III a comparison is made between coatings obtained with the composition according to the invention, coatings obtained from whole egg and coatings obtained with a commercially available, not ready-to-use mix "Ovex bakglans" (ex Zeelandia).

TABLE II

| | Whole egg | OVEX | Sample number | | | | | | |
| --- | --- | --- | --- | --- | --- | --- | --- | --- | --- |
| | reference | bakglans | 1 | 2 | 3 | 4 | 5 | 7 | 8 |
| 'Dänische Brötchen' | | | | | | | | | |
| Gloss remarks: | 3 | 2 | 3 | | | | | | |

TABLE II-continued

| | | | |
|---|---|---|---|
| Appearance remarks: | 3 | 2 | 3 |
| Colour remarks: | 3 | 3 | 3 |
| Mouthfeel crust remarks: | 3 | 3 | 3.5 |
| Croissants | | | |
| Gloss remarks: | 3 | | 4 | | 4 | 3 | 4 |
| Appearance remarks: | 3 | | 4 | | 4 | 3 | 4 |
| Colour remarks: | 3 | | 3 | | 3 | 3 | 3 |
| Mouthfeel crust remarks: | 3 | | | | | | |
| Puff pastry Sheets | | | | | | | |
| Gloss remarks: | 3 | 3 | | 3 | | | |
| Appearance remarks: | 3 | 3 | | 3 | | | |
| Colour remarks: | 3 | 3 | | 3 | | | |
| Mouthfeel remarks: | 3 | 3.5 | | 3.5 | | | |
| 'Gevulde Koeken' (≈ almond paste cakes) | | | | | | | |
| Gloss remarks: | 3 | 3 | | 3 | | | |
| Appearance remarks: | 3 | 4 | | 4 | | | |
| Colour remarks: | 3 | 4 | | 4 | | | |
| Mouthfeel remarks: | 3 | 3 | | 3 | | | |

| SCALE | 1 | – | 3 | – | 5 |
|---|---|---|---|---|---|
| Gloss | less | | reference (whole egg) | | more |
| Colour | less | | reference (whole egg) | | more |
| Appearance | worse than ref. | | reference (whole egg) | | better than ref. |
| Mouthfeel crust | less tough | | reference (whole egg) | | tougher |

TABLE III

| Type of glazing agent Sample number | OVEX bakglans | Glazing according to the invention |
|---|---|---|
| | 2 weeks' storage | |
| 6 | poor results: very dark surface which showed strange bubbles | poor results: very dark surface which showed strange bubbles |
| 9 | smooth surface: light-yellow colouring; good appearance | smooth surface yellow-brown colouring; good appearance |
| 10 | smooth surface light-yellow colouring; good appearance | smooth surface light-brown colouring; good appearance |

EXAMPLE IV

A pre-mix was made in water of 80° C. containing the water, skimmed milk powder and sodium caseinate.

Simultaneously, a mixture of Na-pyrophosphate, unsaturated mono- and diglycerides was dissolved in soybean oil ($N_{20} \approx 0$).

The fat mixture was added to the water phase and the mixture was subjected to Ultra Turrax mixing for 5 minutes. The $D_{3.2}$ (= droplet size) was 3.8 μm.

The composition was sterilized by indirect heat treatment (8 seconds at 140° C.).

The composition of the resulting glazing agent was:

| | wt % |
|---|---|
| Water | 80.5 |
| Na-caseinate | 9.0 |
| SMP | 2.0 |
| BO | 7.94 |
| Emulsifier | 0.06 |
| Na-pyrophosphate | 0.5 |

The viscosity ($n_{20}$) of the sterilized product was about 200 mPa.s.

An aluminium baking sheet was provided with a thin fatlayer. On this fatlayer a layer of the glazing composition was brought, using a pensil. The system so obtained was heated for 15 min. in an oven at 190° C.

Above procedure was repeated using 1) a whole egg glazing composition and 2) a glazing agent as above, but without Na-pyrophosphate.

The baking sheets were cooled for 30 min. after removal from the oven. Cleaning was performed by soaking for 3 min. with water of 55° C.

TABLE IV

| agent | cleaning results |
|---|---|
| whole egg | ++ |
| glazing agent without pyrophosphate | — |
| glazing agent with pyrophosphate | ++ |

We claim:
1. Ready-to-use, sprayable, sterilized glazing agent having an ambient shelf-life of more than three months and having a viscosity at 20° C. of $1-10^5$ mPa.s. consisting essentially of an oil-in-water emulsion having a composition consisting essentially of:

- 5–15 wt. % of a liquid vegetable oil;
- 5–15 wt. % of casein or its salts;
- 0.005–10 wt. % of an emulsifier selected from the group consisting of fatty acid monoglycerides and diglycerides from $C_{14}$–$C_{22}$ fatty acids;
- 0.1–8.0 wt. % of a composition giving a browning upon heating by a Maillard-type reaction; and
- balance: water.

2. Ready-to-use glazing agent according to claim 1, wherein the liquid vegetable oil also comprises 2–15 wt % (on oil) of a hydrogenated vegetable fat.

3. Ready-to-use glazing agent according to claim 1, wherein 8–11 wt. % of casein or its salts are present.

4. Ready-to-use glazing agent according to claim 1, wherein 0.01–1.0 wt. % of emulsifier is present.

5. Ready-to-use glazing agent according to claim 1, wherein the emulsifier is a mixture of monoglycerides and diglycerides from $C_{16}$–$C_{18}$ saturated and/or unsaturated fatty acids.

6. Ready-to-use glazing agent according to claim 1, wherein 0.3–3 wt. % of lactose or a milk product containing lactose is used as the composition giving a browning upon heating.

7. Ready-to-use glazing agent according to claim 1, wherein the liquid vegetable oil has a solid fat index at 20° C. of at most 7.0.

8. Ready-to-use glazing agent according to claim 6, wherein the milk product is skim milk powder or buttermilk powder.

9. Ready-to-use glazing agent according to claim 1, wherein the droplet size of the emulsion is less than 5.0 μm.

10. Ready-to-use glazing agent according to claim 1, wherein the glazing agent comprises additionally 0.1 to 1.5 wt % of a pyrophosphate.

11. Ready-to-use glazing agent according to claim 1, wherein the glazing agent also comprises 1–10 wt % of egg-yolk.

12. A composition according to claim 1 wherein soybean oil is the liquid vegetable oil, sodium caseinate is the casein salt, a fatty acid monoglyceride is the emulsifier, skim milk powder is the composition giving the browning upon heating.

* * * * *